United States Patent
Fukushima

(10) Patent No.: US 6,917,384 B1
(45) Date of Patent: Jul. 12, 2005

(54) IMAGE SENSING APPARATUS, METHOD AND RECORDING MEDIUM STORING PROGRAM FOR METHOD OF SETTING PLURAL PHOTOGRAPHIC MODES AND VARIABLE SPECIFIC REGION OF IMAGE SENSING, AND PROVIDING MODE SPECIFIC COMPRESSION OF IMAGE DATA IN THE SPECIFIC REGION

(75) Inventor: Nobuo Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 09/590,192

(22) Filed: Jun. 9, 2000

(30) Foreign Application Priority Data

Jun. 14, 1999 (JP) .......................................... 11-167397

(51) Int. Cl.[7] ............................................. H04N 5/222
(52) U.S. Cl. ........................... 348/333.03; 348/222.1; 348/346; 348/362
(58) Field of Search ........................... 348/220.1, 208.16, 348/240.2, 345, 350, 221.1, 208.12, 64, 333.03, 346, 362, 222.1; 382/282; 396/121, 122, 123; 250/201.8

(56) References Cited

U.S. PATENT DOCUMENTS

| | | | |
|---|---|---|---|
| 4,816,937 A | 3/1989 | Fukushima | ............... 369/73.03 |
| 5,051,849 A | 9/1991 | Fukushima et al. | ........... 360/69 |
| 5,150,219 A | 9/1992 | Fukushima | ................. 358/335 |
| 5,218,452 A | 6/1993 | Kondo et al. | ................ 358/342 |
| 5,317,404 A | 5/1994 | Fukushima et al. | ......... 358/335 |
| 5,359,422 A | 10/1994 | Fukushima | ................. 358/296 |
| 5,459,508 A | 10/1995 | Fukushima | ................. 348/243 |
| 5,523,857 A | 6/1996 | Fukushima | ................. 358/342 |
| 5,559,321 A * | 9/1996 | Kusaka | ..................... 250/201.8 |
| 5,682,559 A * | 10/1997 | Yoshino et al. | ............. 396/121 |
| 5,692,222 A * | 11/1997 | Yamada et al. | ............... 396/51 |
| 5,726,820 A | 3/1998 | Fukushima | ................... 360/66 |
| 5,767,904 A * | 6/1998 | Miyake | ....................... 348/362 |
| 5,805,300 A | 9/1998 | Fukushima | ................. 358/404 |
| 5,845,166 A * | 12/1998 | Fellegara et al. | ........... 396/429 |
| 5,903,700 A | 5/1999 | Fukushima | ................... 386/46 |
| 6,141,453 A * | 10/2000 | Banham et al. | ............. 382/240 |
| 6,496,607 B1 * | 12/2002 | Krishnamurthy et al. | ... 382/282 |
| 2002/0012051 A1 * | 1/2002 | Mizoguchi | .................. 348/220 |

* cited by examiner

*Primary Examiner*—Tuan Ho
*Assistant Examiner*—Heather R. Long
(74) *Attorney, Agent, or Firm*—Fitzpatrick, Cella, Harper & Scinto

(57) ABSTRACT

When a region of interest of an image is compressed with high quality by an image sensing apparatus, such as a digital camera or the like, the region of interest (ROI) can be compressed by a compression coefficient different from that of other regions of the image according to the so-called JPEG 2000 method. However, setting the ROI is a complicated operation for a user. In the present invention, when a continuous photographing mode is not set, a single image sensing operation is assumed and the ROI is automatically set in a first region, which is the largest of three regions. Whereas in the continuous photographing mode, if a low-speed mode is set, the ROI is set in a second region smaller than the first region, and if a high-speed mode is set, the ROI is set in a third region, which is the smallest. In other words, the ROI is automatically set in the largest region in the single photographing mode, and when the continuous photographing mode is set, the ROI is automatically set larger in the low-speed mode than in the high-speed mode.

22 Claims, 16 Drawing Sheets

| LL | HL2 | HL1 |
|---|---|---|
| LH2 | HH2 | |
| LH1 | | HH1 |

FIG. 4A
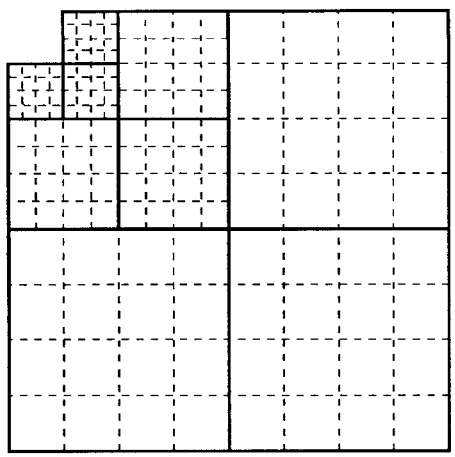
FIG. 4B
FIG. 4C
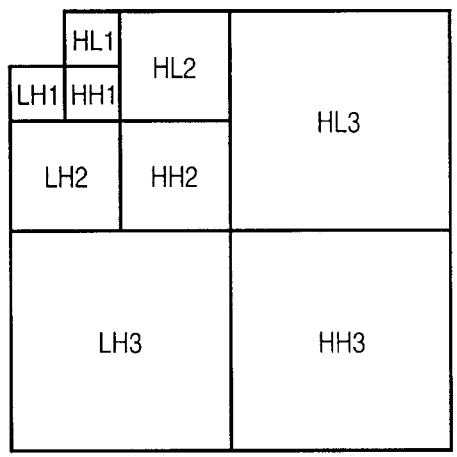
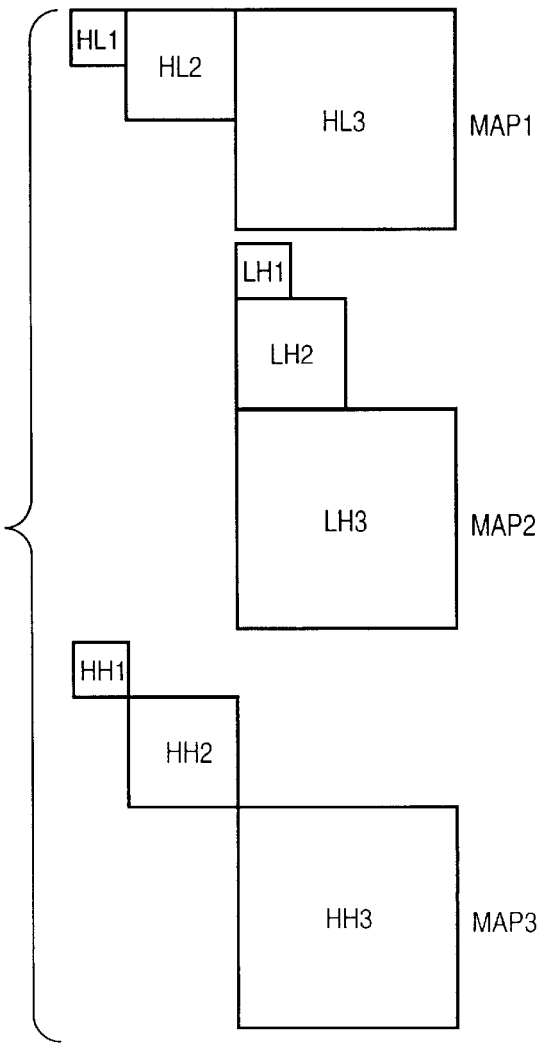
FIG. 4D

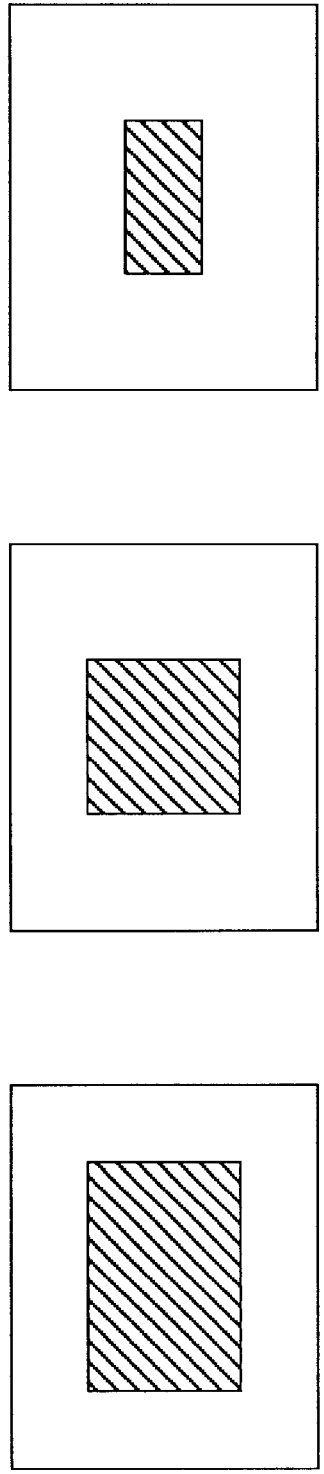
F I G. 12A    F I G. 12B    F I G. 12C

IMAGE SENSING APPARATUS, METHOD AND RECORDING MEDIUM STORING PROGRAM FOR METHOD OF SETTING PLURAL PHOTOGRAPHIC MODES AND VARIABLE SPECIFIC REGION OF IMAGE SENSING, AND PROVIDING MODE SPECIFIC COMPRESSION OF IMAGE DATA IN THE SPECIFIC REGION

FIELD OF THE INVENTION

The present invention relates to an image sensing apparatus and control method thereof, and more particularly, to an image sensing apparatus for compressing sensed images and storing the compressed images, and to a control method thereof.

BACKGROUND OF THE INVENTION

Image sensing apparatuses, e.g., conventional digital cameras or the like, which sense, record and reproduce an image, often employ a data compression technique complying with the JPEG baseline scheme.

However, the conventional JPEG baseline scheme utilizes one quantization table for the entire image on a screen. Therefore, it is impossible to record a particular region of an image in higher quality than other regions of the image. If a user desires higher image quality for a particular region of the image, other regions must also be compressed as a high-quality image. As a result, the size of the compressed image file becomes large, and this causes problems of time-consuming data transfer or printing operation.

Furthermore, when recording time is limited, e.g., at a time of image data transfer or during a continuous photographing operation, it is preferable to keep the size of an image file small, but this raises a problem of deteriorated image quality.

Currently, so-called JPEG 2000 is under review as the next-generation compression scheme. Although detailed description will not be provided herein, the JPEG 2000 is characterized by the function of designating a region of interest (hereinafter referred to as an ROI) in an image and coding the image of the designated ROI with a different compression coefficient (compression rate) from that of other regions. This ROI function can be one of the solutions to the aforementioned problems. More specifically, in order to reproduce an image of the ROI with higher precision than other regions, a lower compression coefficient than that of other regions may be set.

However, in the case of applying the ROI function to, e.g., a digital camera or the like, designation of an ROI becomes problematic. For instance, it is extremely complicated for a user to designate the ROI each time a photograph is taken.

SUMMARY OF THE INVENTION

The present invention has been proposed to solve the conventional problems, and has as its object to provide an image sensing apparatus and control method thereof for automatically setting an appropriate region of interest (ROI) in an image and performing different coding on the image of the ROI from that of other regions.

According to the present invention, the foregoing object is attained by providing an image sensing apparatus comprising: mode setting means for setting a photographing mode; region setting means for setting a specific region of an image to be sensed in accordance with the set photographing mode; image sensing means for sensing an image in the set photographing mode; and compression means for compressing the specific region of the sensed image by a compression method different from that of other regions of the sensed image.

By virtue of the present invention as described above, since an image region to be reproduced in high quality can automatically be set in correspondence with a photographing mode, an appropriate region of the image can be output in high quality in correspondence with the photographing mode.

It is another object of the present invention to provide an image sensing apparatus and control method thereof which enable a user to turn on/off the automatic setting of the ROI.

According to the present invention, the mode setting means is preferably further capable of setting either a mode where the specific region is set by the region setting means, or a mode where the specific region is not set by the region setting means.

By virtue of the present invention as described above, the image quality of the entire sensed image can be made uniform, and flexibility in expression of a sensed image is increased.

It is another object of the present invention to provide an image sensing apparatus and control method thereof which do not automatically set the ROI when a camera is set in a continuous photographing mode.

According to the present invention, the region setting means preferably does not perform setting of the specific region when a continuous photographing mode is set by the mode setting means.

By virtue of the present invention as described above, when a continuous photographing operation is performed, variation of image sensing intervals can be kept within a predetermined range. Therefore, image sensing intervals can be kept short or constant.

According to the foregoing features, since the present invention appropriately sets a region of interest in an image and performs different coding on the image of the region of interest from that of other regions, the image can be compressed with a desired image quality and a desired size.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A, 4B, 4C and 4D are explanatory views for explaining operation of a coefficient classifying unit;

FIGS. 12A, 12B and 12C show, as an example, designated ROIs according to the first embodiment;

DETAILED DESCRIPTION OF THE PREFERRED EMBODIMENTS

Preferred embodiments of the present invention will now be described in detail in accordance with the accompanying drawings.

<First Embodiment>

Figure 1:
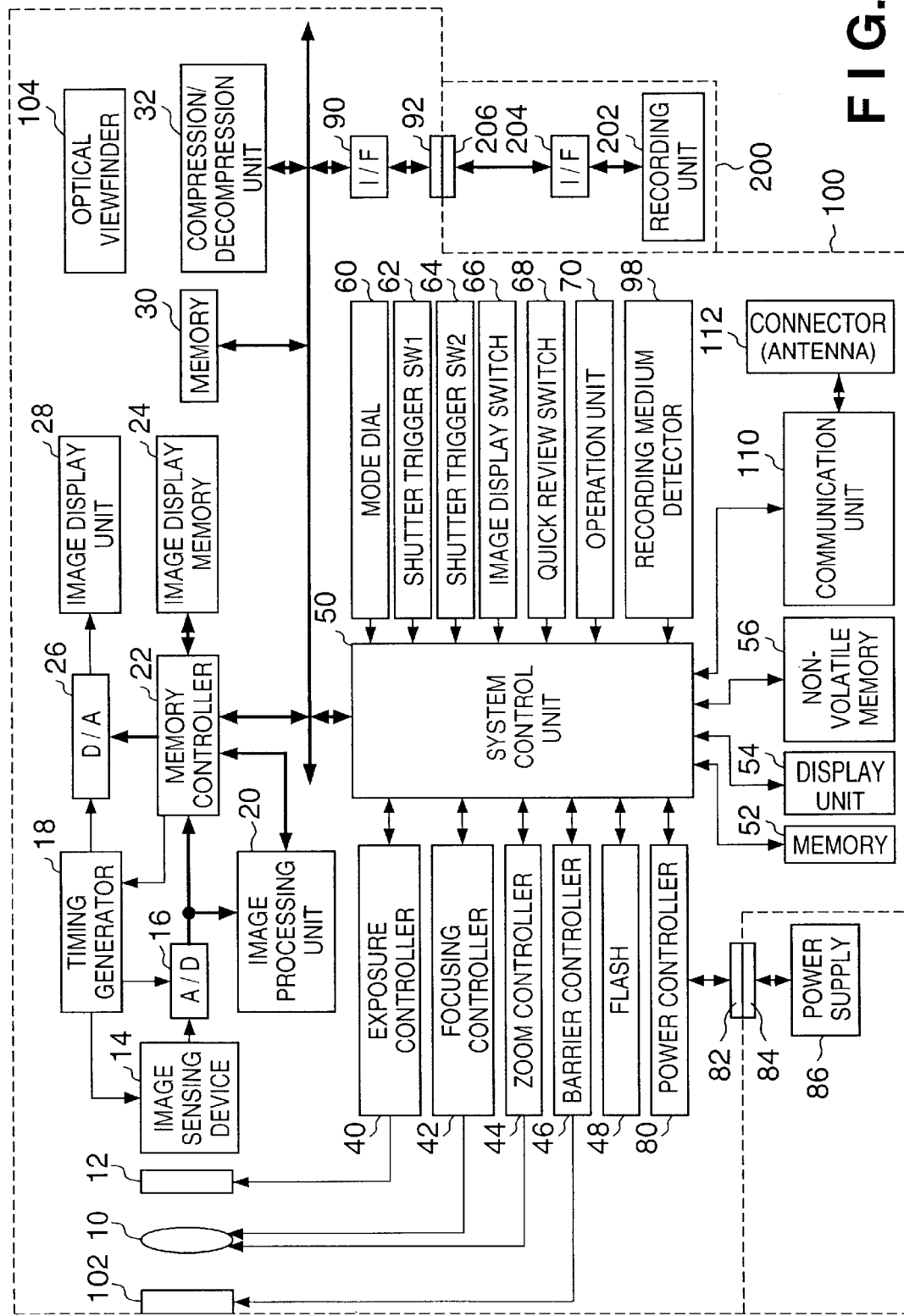
FIG. 1 is a block diagram showing a construction of an image sensing system according to a first embodiment of the present invention.

FIG. 1 is a block diagram showing a construction of an image sensing system according to the first embodiment. Reference numeral 100 denotes an image sensing apparatus, such as a digital camera or the like, and 200 denotes a recording medium, such as a memory card, hard disk or the like.

Construction of Image Sensing Apparatus

Hereinafter, a construction of the image sensing apparatus 100 is described in detail. Reference numeral 10 denotes a lens; 12, a shutter having a diaphragm function; 14, an image sensing device which converts an optical image to electrical signals; and 16, an A/D converter for converting analog signals output by the image sensing device 14 to digital signals. Reference numeral 18 denotes a timing generator which supplies clock signals or control signals to the image sensing device 14, A/D converter 16, and D/A converter 26, and is controlled by a memory controller 22 and system control unit 50.

Reference numeral 20 denotes an image processing unit which performs predetermined pixel interpolation processing or color conversion processing on data output by the A/D converter 16 or memory controller 22. Furthermore, in the image processing unit 20, predetermined computation is performed on the sensed image data, and Auto White Balance (AWB) processing, employing a through-the-lens (TTL) system, is performed based on the obtained computation result. Furthermore, the result of computation performed on the sensed image data is transferred to the system control unit 50. Based on the received computation result, the system control unit 50 controls the exposure controller 40 and focusing controller 42 to perform processing such as autofocus (AF), autoexposure (AE), or flash pre-emission (EF) employing the TTL system.

Reference numeral 22 denotes a memory controller for controlling the A/D converter 16, timing generator 18, image processing unit 20, image display memory 24, D/A converter 26, memory 30, and compression/decompression unit 32. To record a sensed image, digital data output by the A/D converter 16 is written in the image display memory 24 or memory 30 through the image processing unit 20 and memory controller 22, or directly through the memory controller 22.

Reference numeral 24 denotes an image display memory; 26, a D/A converter; and 28, an image display unit, which is an LCD employing a thin-film transistor (TFT). Image data to be displayed, which is written in the image display memory 24, is displayed on the image display unit 28 through the D/A converter 26. Serially displaying sensed images on the image display unit 28 can realize an electronic viewfinder function. The image display unit 28 is capable of turning on/off the display function arbitrarily in accordance with an instruction by the system control unit 50. By turning off the display function, the power consumption of the image sensing apparatus 100 can be largely reduced.

Reference numeral 30 denotes memory for storing sensed still images or motion images. The memory 30 has a capacity large enough to store a predetermined number of still images, or motion images that correspond to a predetermined time period. By virtue of this capacity, image data writing in the memory 30 for a large amount of image data can be realized at high speed, even in a case where plural numbers of still images are continuously photographed, or in a case of photographing panoramic images. The memory 30 can also serve as a work area of the system control unit 50.

Reference numeral 32 denotes a compression/decompression unit which reads image data stored in the memory 30, performs compression/decompression processing, and writes the compressed/decompressed data in the memory 30. Details of the compression/decompression unit 32 will be described later.

Reference numeral 102 denotes a barrier which protects the image sensing unit, including the lens 10, by covering it, and prevents the image sensing unit from being stained or damaged. Reference numeral 104 denotes an optical viewfinder which enables photographing operation without utilizing the electronic viewfinder function of the image display unit 28. Additionally, the optical viewfinder 104 includes a part of the functions of a display unit 54: e.g., focus display, vibration-warning display, flash-charging-state display, shutter speed display, f-stop display, exposure compensation display, and so forth.

Reference numeral 40 denotes an exposure controller for controlling the shutter 12 having a diaphragm function. Together with a flash 48, the exposure controller 40 also has a flash control function. Reference numeral 42 denotes a focusing controller for controlling focus of the lens 10; 44, a zoom controller for controlling zoom of the lens 10; and 46, a barrier controller for controlling operation of the barrier 102 which protects the lens 10. Reference numeral 48 denotes a flash having an AF-fill-light projection function and flash control function.

The exposure controller 40 and focusing controller 42 are controlled in the TTL system. As mentioned above, based on the result of computation performed by the image processing unit 20 on the sensed image data, the system control unit 50 controls the exposure controller 40 and focusing controller 42.

Reference numeral 50 denotes a system control unit for controlling the entire image sensing apparatus 100; and 52, memory such as flash ROM or the like, which stores constants and variables for operation of the system control unit 50 and programs or the like.

Reference numeral 54 denotes a display unit for displaying an operation state of the apparatus or messages or the like with the use of characters, images and sound, in accordance with execution of a program by the system control unit 50. The display unit 54 is constructed with a liquid crystal display, speaker and the like, and more specifically, an LCD, LED and sound generation device or the like. Single or plural numbers of display units 54 are provided at a location easily visible near the operation part of the image sensing apparatus 100. A part of the functions of the display unit 54 is included in the optical viewfinder 104. Among the contents displayed by the display unit 54, those displayed on the LCD or the like include: a single/continuous photographing mode, self-timer, compression rate, the number of pixels recorded, the number of images recorded, the remaining number of recordable images, shutter speed, f-stop, exposure compensation, flash function, pink-eye minimizing function, macro photographing function, buzzer setting function, the remaining amount of clock battery, the remaining amount of battery, error information, information using plural digits of numbers, existence/absence of recording medium 200, communication I/F operation state, date/time and so forth. Furthermore, among the contents displayed by the display unit 54, those displayed on the optical viewfinder 104 include: focusing information, vibration warning, flash charging state, shutter speed, f-stop, exposure compensation and so on.

Reference numeral 56 denotes an electrically erasable/programmable non-volatile memory, such as EEPROM, for storing various adjustment values or the like.

Reference numerals 60, 62, 64, 66, 68 and 70 denote an operation portion for inputting various operation instructions to the system control unit 50. The operation portion is constructed with one or a combination of a switch or dial, a touch panel, a pointing device employing line-of-sight detection, a sound recognition device, and so on. Hereinafter, each component of the operation portion is described in detail.

Reference numeral 60 denotes a mode dial switch for setting the apparatus in one of various function modes, e.g., the power-off mode, automatic photograph mode, photograph mode, panoramic photograph mode, replay mode, multiple-screen replay/erase mode, PC connection mode and so forth.

Reference numeral 62 denotes a shutter trigger switch 1 (SW1), which is activated by depressing half-way a shutter button (not shown), to start various operations such as autofocusing (AF), autoexposure (AE), Auto White Balance (AWB), flash pre-emission (EF) processing and the like. Reference numeral 64 denotes a shutter trigger switch 2 (SW2), which is activated by fully depressing the shutter button, to start the following series of processing operations: exposure processing, where a signal read from the image sensing device 14 is written as image data in the memory 30 through the A/D converter 16 and memory controller 22; developing processing, where computation is performed by the image processing unit 20 and memory controller 22; and recording processing, where image data is read out of the memory 30, compressed by the compression/decompression unit 32, and written in the recording medium 200.

Reference numeral 66 denotes an image display switch for turning on/off the image display unit 28. By virtue of this function, when image sensing is performed with the use of the optical viewfinder 104, a current supplied to the LCD display unit can be cut off, thereby contributing to the reduction of power consumption. Reference numeral 68 denotes a quick review switch for setting a quick review function, where sensed image data is automatically replayed immediately after the photographing operation. Note, in the first embodiment, the quick review function can be set when the image display unit 28 is turned off.

Reference numeral 70 denotes an operation unit including a menu button, a setting button, a macro button, a multiple-screen replay and page-advance button, a flash setting button, a single/continuous/self-timer photographing mode switch, a menu selection+(plus) button, a menu selection−(minus) button, a replay image selection+(plus) button, a replay image selection−(minus) button, a photo-quality selection button, an exposure compensation button, a date/time setting button, and so on.

Reference numeral 80 denotes a power controller which detects the existence/absence of a battery, the type of battery, and the remaining amount of battery power, and is constructed with a battery detection circuit, a DC-DC converter, and a switch circuit for switching a block to be supplied with current. Based on the result of battery detection and an instruction from the system control unit 50, the DC-DC converter is controlled and a required voltage is supplied to respective units, including the recording medium 200, for a predetermined time period.

Reference numerals 82 and 84 denote connector elements for connecting the image sensing apparatus 100 and power controller 80 with a power supply 86. Reference numeral 86 denotes a power supply, including a primary battery, such as an alkaline battery, lithium battery, or the like, a secondary battery, such as a NiCd battery, NiMH battery or the like, or an AC adapter.

Reference numeral 90 denotes an interface with the recording medium 200; 92, a connector that connects the image sensing apprartus 100 with the recording medium 200; and 98, a recording medium detector which detects whether or not a recording medium 200 is connected to the connector 92. Note that the first embodiment employs, as an interface and connector, a PCMCIA card and compact flash (CF) card complying with the standard.

Reference numeral 110 denotes a communication unit including various communication functions for the RS232C or USB, IEEE1394, P1284, SCSI, modem, LAN, wireless communication and so forth. Reference numeral 112 denotes a connector which connects the image sensing apparatus 100 with other devices through the communication unit 110, or denotes an antenna in a case of wireless communication.

Reference numeral 200 denotes a recording medium, e.g., a memory card, hard disk or the like, which is attachable/detachable to the image sensing apparatus 100. The recording medium 200 comprises: a recording unit 202 configured with a semiconductor memory, a magnetic disk or the like; an interface 204 serving as an interface with the image sensing apparatus 100; and a connector 206 which connects the recording medium 200 with the image sensing apparatus 100.

Details of Compression/Decompression Unit

Figure 2:
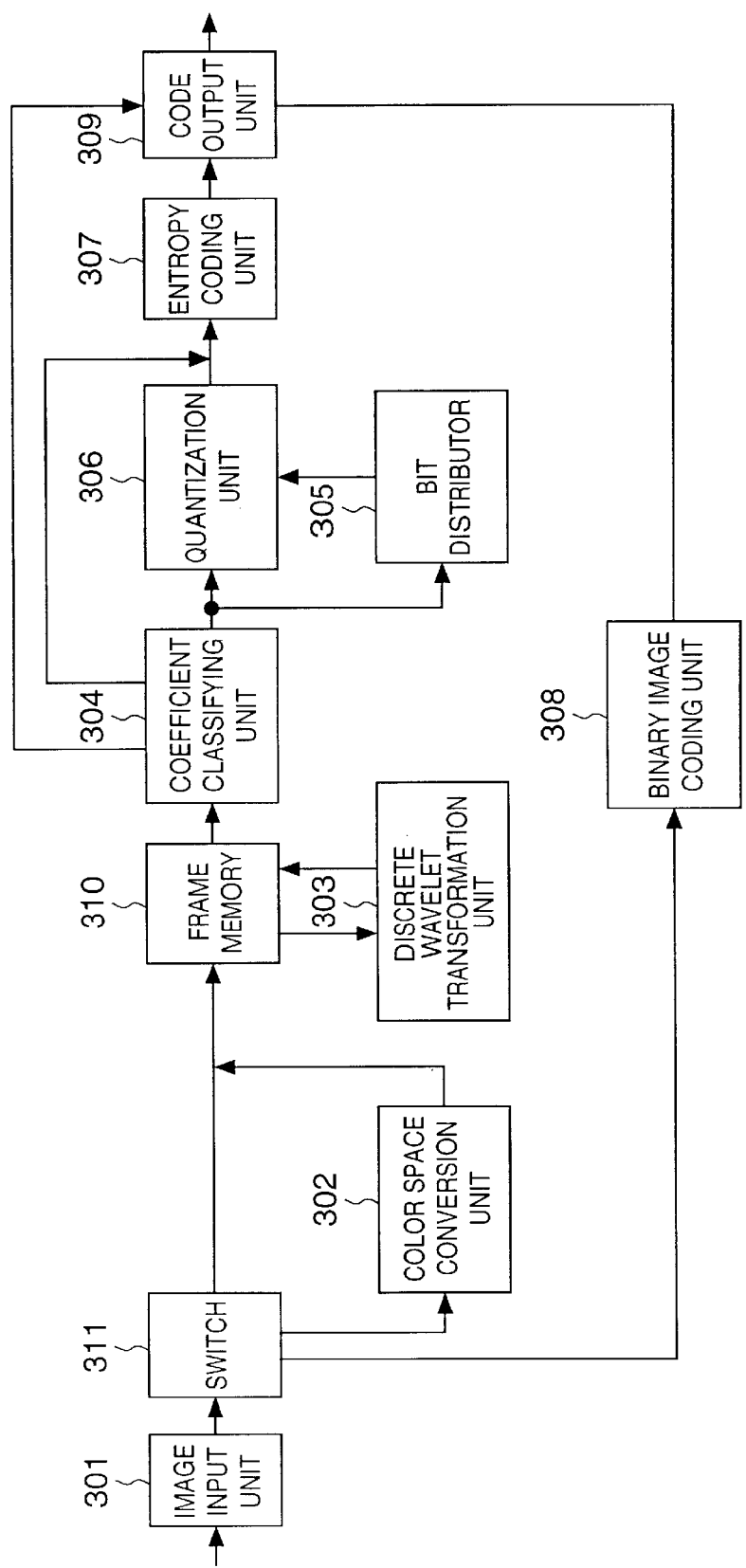
FIG. 2 is a block diagram showing a construction for performing coding by a compression/decompression unit.
Figure 8:
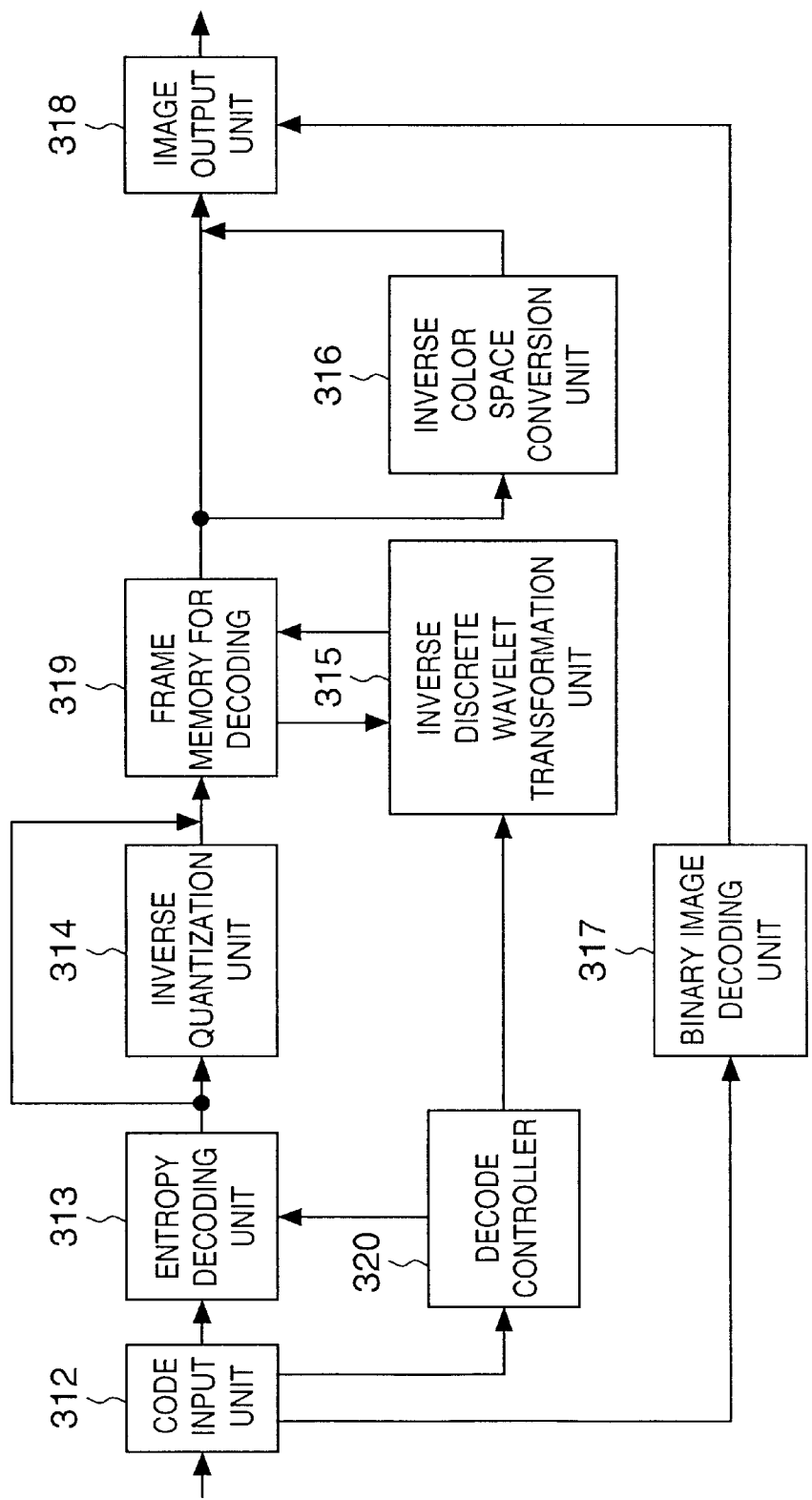
FIG. 8 is a block diagram showing a construction for performing decoding by the compression/decompression unit.

Detailed construction of the compression/decompression unit 32 is shown in FIGS. 2 and 8, and operation thereof will be described hereinafter. Note that the compression/decompression unit 32 according to the first embodiment is characterized by compressing/decompressing image data according to the method complying with the so-called JPEG 2000.

FIG. 2 is a block diagram showing the construction particularly for performing image data compression by the compression/decompression unit 32. In FIG. 2, reference numeral 301 denotes an image input unit; 302, a color space conversion unit; 303, a discrete wavelet transformation unit; 304, a coefficient classifying unit; 305, a bit distributor; 306, a quantization unit; 307, an entropy coding unit; 308, a binary image coding unit; 309, a code output unit; and 310, a frame memory.

First, a luminance signal and chromaticity signal, constituting an image to be coded, are input via the image input unit 301 in order of raster scanning.

Figures 3A, 3B:
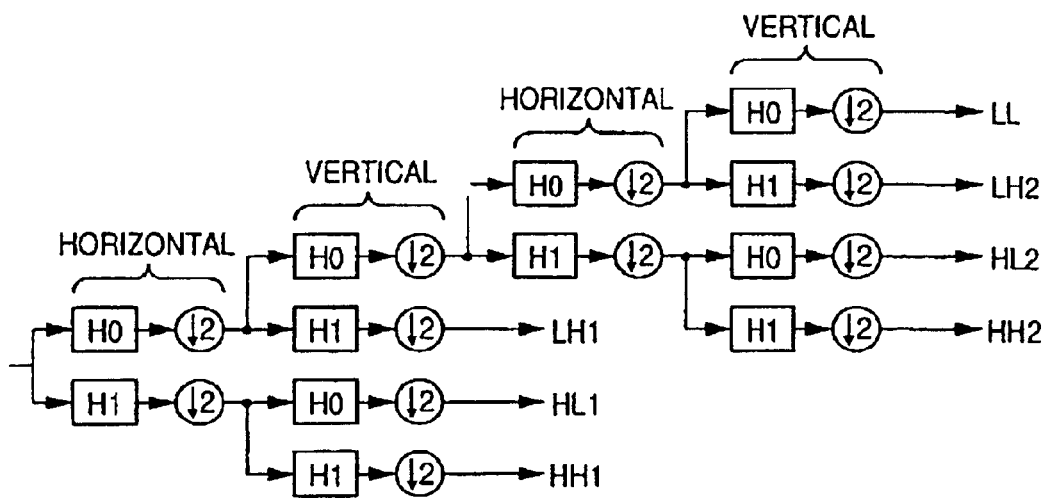
FIGS. 3A and 3B are explanatory views for explaining operation of a discrete wavelet transformation unit.

FIG. 3A shows a detailed configuration of the discrete wavelet transformation unit 303. In FIG. 3, H0 and H1 denote FIR filters, wherein H0 is a low-pass filter and H1 is a high-pass filter. The circles having downward-pointing arrows indicate down-sampling. An input multivalued image signal is divided into signals of different frequency bands by the filters H0 and H1, and down-sampled at a ratio of 2:1. Since this configuration is equivalent to a filter bank having two channels, which is a known structure, a detailed description will not be provided herein.

The transformation processing on the multivalued image signal, input in FIG. 3A, is performed in the horizontal and vertical directions as one set. After the first set of processing is completed, the same processing is repeated for the signal having the lowest frequency band, and ultimately a series of data arrays having seven different frequency bands are obtained.

FIG. 3B shows the input multivalued image signal, divided into different frequency bands as a result of performing transformation by the discrete wavelet transformation unit 303 which has the configuration shown in FIG. 3A. In this example, each of the frequency bands is labeled as HH1, HL1, LH1, . . . , LL. Note in the following description, one set of transformation processing in the horizontal and vertical directions is considered as one level of division, and each of the frequency bands HH1, HL1, LH1, . . . , LL will be referred to as a sub-band.

Next, operation of the coefficient classifying unit 304 is described. The coefficient classifying unit 304 classifies transformation coefficients, belonging to the sub-bands shown in FIG. 3B, according to a predetermined method, and outputs a plurality of data arrays in groups.

With the exception of the sub-band having the lowest frequency band (sub-band LL in the case of FIG. 3B), each of the sub-bands is divided into a plurality of blocks as shown in FIG. 4A (indicated by broken lines). Based on the characteristic of coefficient in each block, the plurality of blocks are classified into two types of classes (classes 0 and 1). The blocks are formed such that the number of blocks in each sub-band is equal, and such that the size of each block is reduced by ½ as the sub-band (frequency band) progresses from high resolution to low resolution. For instance, in FIG. 4C, the size of each block in HL3 is 16×16 (pixels); the size of each block in HL2 is 8×8 (pixels); and the size of each block in HL1 is 4×4 (pixels).

After each sub-band is divided into blocks as described above, the coefficient classifying unit 304 classifies the blocks according to the coefficients. More specifically, assuming that the two classes to be classified are classes 0 and 1, the distribution Vi of coefficients in the block is obtained, and blocks are classified as follows based on the average value T of the distribution.

distribution $Vi \geq T$: Class 1 distribution $Vi \leq T$: Class 0

The result of classification is temporarily stored in an internal memory of the coefficient classifying unit 304 in the form of bitmap data as shown in FIG. 4B.

Next, the coefficient classifying unit 304 generates a map based on the classification result stored in the aforementioned internal memory. The map is generated for sub-bands having the same frequency bands in the horizontal and vertical directions. For instance, in a case where three levels of wavelet transformation processing shown in FIG. 40 are performed, each sub-band is classified into three types (HL3, HL2, HL1), (LH3, LH2, LH1), and (HH3, HH2, HH1), and maps are generated respectively. Thus, from each coefficient group obtained by performing wavelet transformation of a unit of 2n×2n pixels, three maps are generated.

The coefficient classifying unit 304 performs entropy coding on the generated maps, and outputs the result to the code output unit 309 to be added to the final bit stream.

Meanwhile, the coefficient classifying unit 304 scans the blocks for each map. Coefficients of the blocks that belong to the same class as a result of the foregoing classification are grouped together as one sequence and converted to a data array. Note that scanning the transformation coefficients in the block is performed in order of raster scanning, and the sequence is output to the subsequent quantization unit 306.

Next, the bit distributor 305 is described before explaining the quantization unit 306. The bit distributor 305 determines the quantization step (allocated number of bits Ri), used for quantization by the quantization unit 306, for each sequence input by the coefficient classifying unit 304.

The quantization unit 306 obtains a quantization step qi based on the allocated number of bits Ri determined by the bit distributor 305, and quantizes each sequence output by the coefficient classifying unit 304.

Herein, assume that the allocated number of bits Ri and quantization step qi are predetermined and stored in a look-up table of the quantization unit 306 in the first embodiment.

Figure 5:
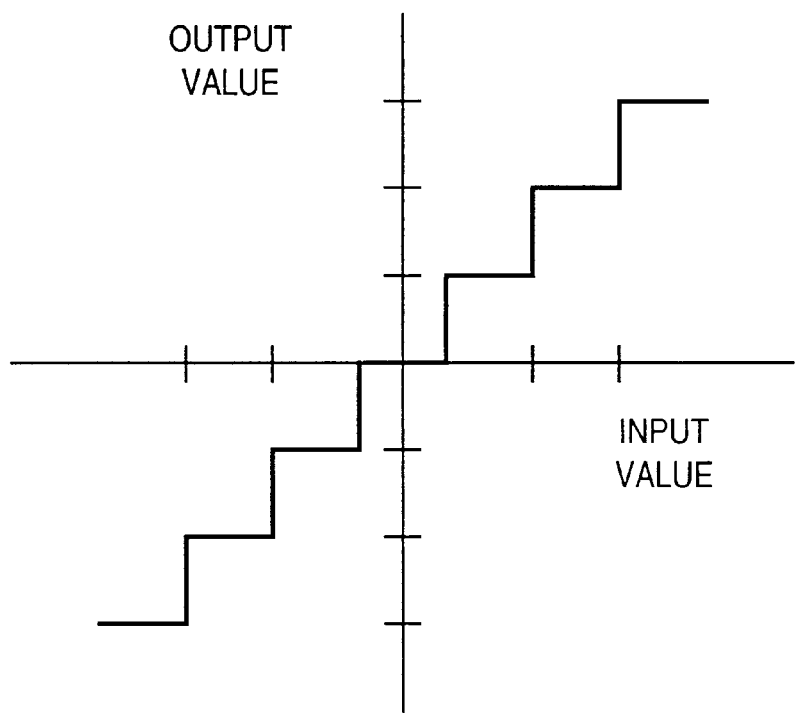
FIG. 5 is a graph showing a relation between an input value and output value in a quantization unit.

FIG. 5 shows a relation between an input value and output value in the quantization unit 306. As shown in the graph, the quantization unit 306 converts the wavelet transformation coefficient value, included in each sequence, to a quantized coefficient value (hereinafter simply referred to as a coefficient value), and outputs it to the subsequent entropy coding unit 307.

Figure 6A:
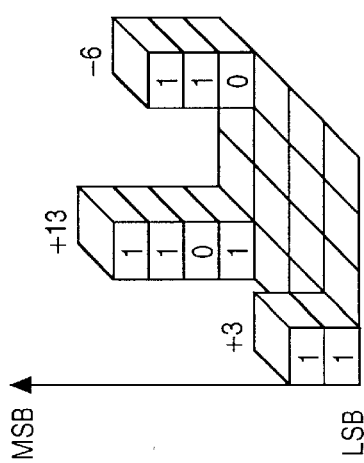
FIGS. 6A and 6B are explanatory views for explaining operation of an entropy coding unit.
Figure 6B:
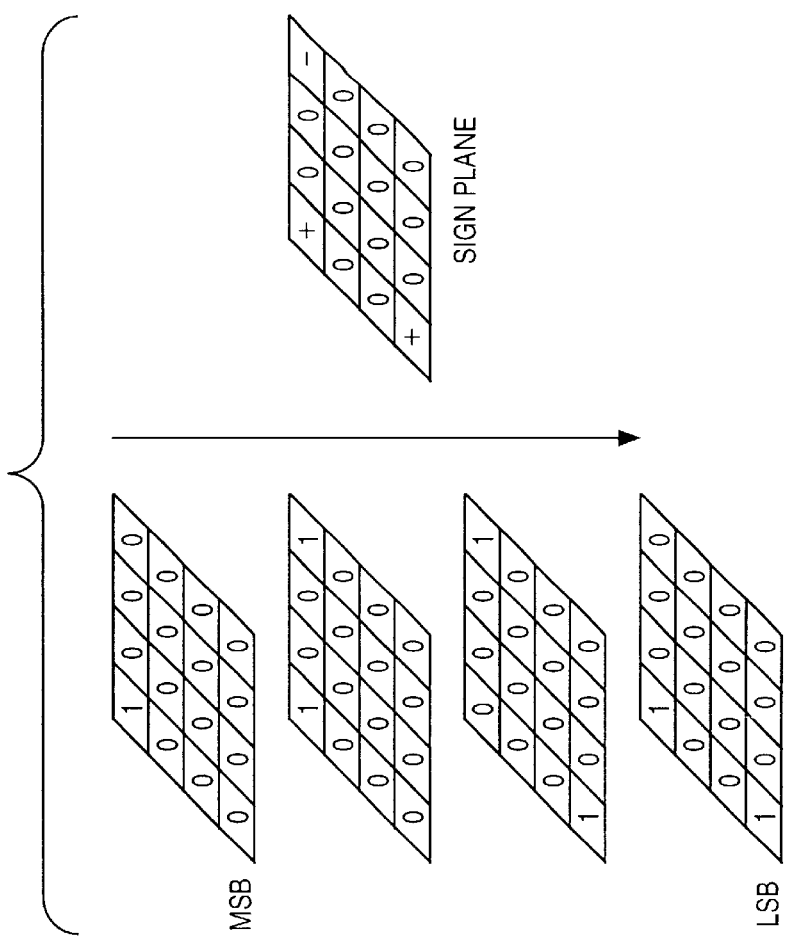

The entropy coding unit 307 separates the input coefficient value into bit planes, performs binary arithmetic coding for each bit plane, and outputs a code stream. FIGS. 6A and 6B are explanatory views for explaining operation of the entropy coding unit 307. According to this example, there are three non-zero coefficients, having the values of +13, −6, and +3, in the 4×4 sequence. The entropy coding unit 307 scans the sequence and obtains the maximum value M, and then calculates the number of bits S necessary to express the maximum coefficient.

In FIG. 6A, the maximum coefficient value is 13; thus, the number of bits S is 4. The 16 coefficient values in the sequence are processed in units of four bit planes, as shown in FIG. 6B. The entropy coding unit 307 performs binary arithmetic coding on each bit of the most significant bit plane (MSB plane), and outputs the result as a bit stream. While lowering the bit plane one level at a time (level-by-level), the entropy coding unit 307 similarly performs binary arithmetic coding on each bit of the bit planes until the subject bit plane reaches the least significant bit plane (LSB plane), and outputs the result to the code output unit 309. At this stage, the sign of each coefficient value is treated as one bit plane. When a first non-zero bit is detected in the bit plane of a coefficient value, the sign of the immediately subsequent coefficient value is entropy-coded.

Figure 7A:
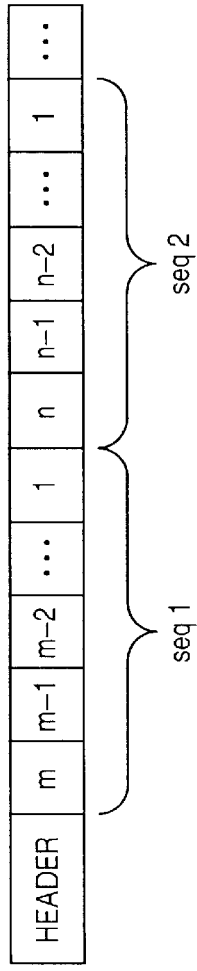
FIGS. 7A, 7B and 7C are schematic views showing a construction of a bit stream output from the entropy coding unit.

FIG. 7A is a schematic view showing a construction of the bit stream output from the entropy coding unit 307 to the code output unit 309. The bit stream has a header including information such as the size of an image, the division level of the discrete wavelet transformation, and so forth. Subsequent to the header, coded data for each sequence is output, starting from the most significant bit plane at which the coefficient value in the sequence is separated into bit planes.

According to the configuration shown in FIG. 7A, sequence 1 (seq 1) has m number of bit planes. Starting from the m-th bit plane, m−1, m−2, . . . , 1 bit planes constitute the coded bit stream. In the subsequent sequence 2 (seq 2), similarly n-th to 1 bit planes constitute the bit stream. The subsequent sequences have similar configurations.

Figure 7B:
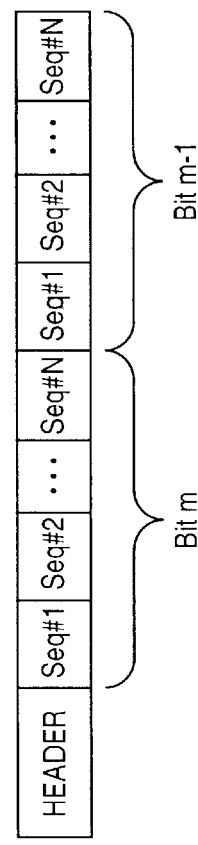
Figure 7C:
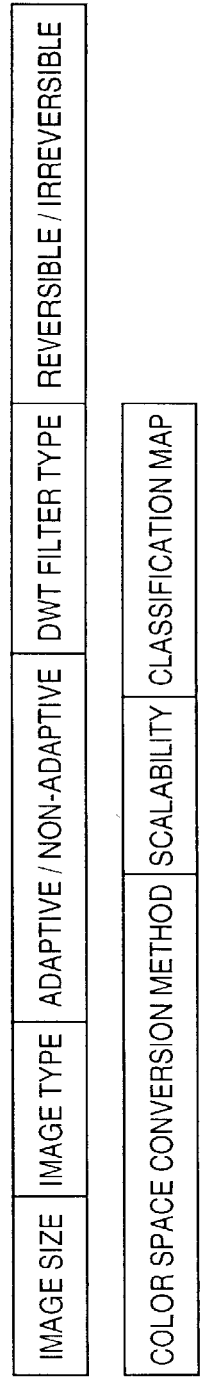

FIG. 7C shows a header configuration. The header is configured with, starting from the top, the size of an original image, the type of image signal (binary, multivalued color, multivalued monochrome and so on), a flag indicative of an adaptive mode, the type of filter of the discrete wavelet transformation (DWT), a flag indicating a reversible/irreversible state, the type of color space conversion method, the scalability, an entropy-coded classification map and the like. Note that the classification map exists only when the adaptive mode is set. Scalability is described hereinafter.

With the above-described construction, since image data can be hierarchically transmitted in order of low to high frequency components of the coefficient values obtained by discrete wavelet transformation, it is possible in the receiving side to receive a brief image in the hierarchical manner. Furthermore, since hierarchical data transmission with respect to each frequency component is performed for each bit plane, the receiving side can hierarchically receive the brief image with respect to each frequency component. In the first embodiment, this construction is referred to as a space scalable construction.

The entropy coding unit 307 can output another construction of bit stream. An example is shown in FIG. 7B. In FIG. 7B, the header is the same as that of FIG. 7A. The subsequent bit stream is configured with the sequences arranged in order of coded data having identical bit plane numbers. With this configuration, the coefficient values obtained by discrete wavelet transformation are sequentially transmitted from the MSB plane to the LSB plane for all sub-bands. Thus, at the receiving side, it is possible to perform progressive decoding in order from low image quality to high image quality for an image having the same resolution as that of the original image. In the first embodiment, this construction is referred to as an SNR scalable construction. Together with the aforementioned space scalable construction, these functions will be referred to as scalability.

Hereinafter, the method of decoding a bit stream, coded in the foregoing manner, is described.

FIG. 8 is a block diagram showing a construction particularly for decoding the coded image data using the compression/decompression unit 32. In FIG. 8, reference numeral 312 denotes a code input unit; 313, an entropy decoding unit; 314, an inverse quantization unit; 315, an inverse discrete wavelet transformation unit; 316, an inverse color space conversion unit; 317, a binary image decoding unit; 318, an image output unit; and 319, a frame memory for decoding.

The code input unit 312 inputs a bit stream, analyzes the header included in the bit stream to extract parameters necessary for subsequent processing, and controls the processing flow in FIG. 8, if necessary, or outputs a necessary parameter to the subsequent processing units. The detail of the header is shown in FIG. 7C.

Hereinafter, descriptions are provided for a case where the scalability is designated as space scalable in the header.

When the header indicates that coding is irreversible, the entropy decoding unit 313 inputs a bit stream and decodes the quantized coefficient value. At this stage, the sequence in the input bit stream which is subjected to decoding is controlled by the decode controller 320. The decode controller 320 decides the necessary sequence based on the resolution of the decoded image determined by a predetermined method. Resolution may be designated interactively by a user, or may automatically be determined by another application program.

Figure 9A:
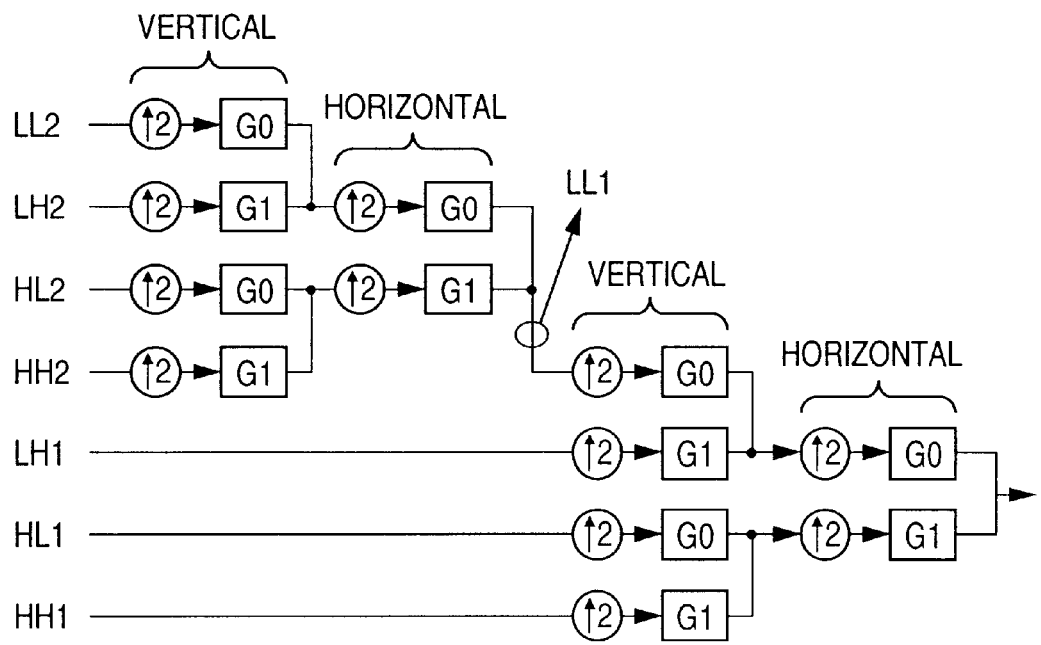
FIGS. 9A, 9B and 9C are explanatory views for explaining operation of an inverse discrete wavelet transformation unit.
Figure 9B:
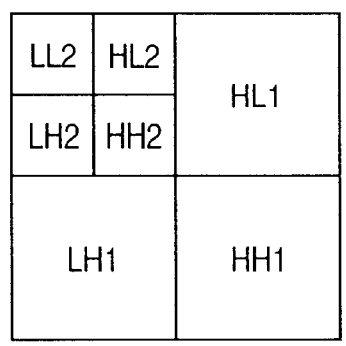

As a result of the above decoding, a series of sequences including quantized coefficient values is obtained, and the sequences are output to the subsequent inverse quantization unit 314. The inverse quantization unit 314 inversely quantizes the coefficient values of the input sequences, and stores the resultant discrete wavelet transformation coefficients in the frame memory 319. In a case where decoding of all sequences is specified by the decode controller 320, all sub-bands are decoded. For instance, in a case where two levels of division shown in FIG. 3B are performed, the inversely quantized transformation coefficients are stored as shown in FIG. 9B in the frame memory 319.

Described next is the step of performing inverse discrete wavelet transformation by the inverse discrete wavelet transformation unit 315 on the transformation coefficients stored in the frame memory 319. FIG. 9A shows a detailed configuration of the inverse discrete wavelet transformation unit 315. First, the inverse discrete wavelet transformation unit 315 vertically reads the transformation coefficients from the LL2 and LH2, stored in the frame memory 319, thereby up-sampling the coefficients at a ratio of 1:2, then performs filtering with G0 on LL2, performs filtering with G1 on LH2, and the resultant data are added. With respect to the HL2 and HH2, the same processing is performed. Next, the inverse discrete wavelet transformation unit 315 horizontally reads the results of the above processing, performs up-sampling on the results obtained from LL2 and LH2 and performs filtering with G0, performs up-sampling on the results obtained from HL2 and HH2 and performs filtering with G1, and the resultant data are added. By the above processing, one level of synthesis is completed.

Figure 9C:
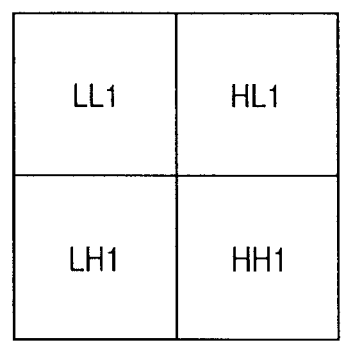

By performing the foregoing processing for two levels, when one set of vertical and horizontal processing is completed, coefficients having different resolutions that represent the original image are obtained. By outputting the obtained coefficients to the inverse color space conversion unit 316 and performing a necessary inverse color conversion, an image having different resolutions can be restored. For instance, performing one level of synthesis of the coefficients shown in FIG. 9B restores the LL1 as shown in FIG. 9C, and the LL1 can be output as a restored image.

Herein, by defining the level of synthesis with the decode controller 320, it is possible to restore images having different resolutions to that of the original image. Note, although the first embodiment describes the case where transformation coefficients of all sub-bands are decoded, the number of sequences read by the entropy decoding unit 313 may be limited. More specifically, only the sequences necessary to achieve a required resolution may be read from the bit stream and inverse transformation for the necessary number of levels may be performed to attain the above-described result.

As described above, images having different resolutions can be restored by decoding necessary sequences from the bit stream, performing inverse quantization, and synthesizing the decoded coefficients for a predetermined number of levels.

Hereinafter, description is provided for a case where the scalability is designated as SNR scalable in the header of a bit stream.

When the header indicates that the image type is a binary image, an image is reproduced by the method described above and output to the image output unit 318. The processing described above is applicable even if the image type is a multivalued color image or a multivalued monochrome image. Thus, hereinafter, a multivalued monochrome image is described as an example.

When the entropy decoding unit 313 decodes an input bit stream, note that the bit stream of each sequence is arranged in order of higher bit planes, as shown in FIG. 7B. The entropy decoding unit 313 sequentially reads the bit stream data and performs decoding in order of the higher bit planes of each sequence. The decode controller 320 decides, in advance, the number of bytes of data subjected to decoding according to a predetermined method. For instance, the amount of data may be calculated from the bit rate of a decoded image, or the number of bytes may be directly specified.

Figure 10A:
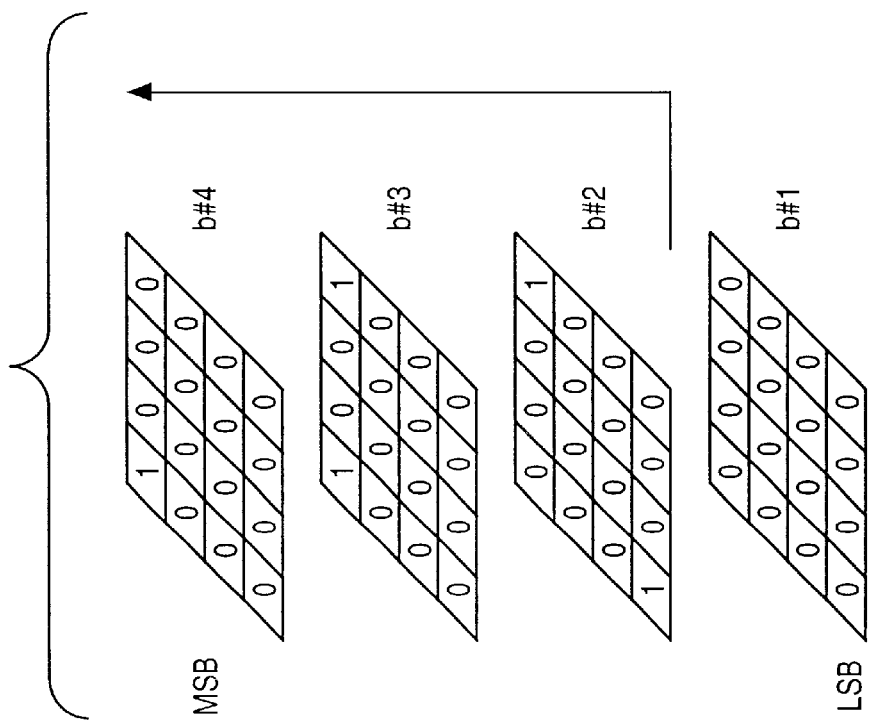
FIGS. 10A and 10B are explanatory views for explaining operation of an entropy decoding unit.
Figure 10B:
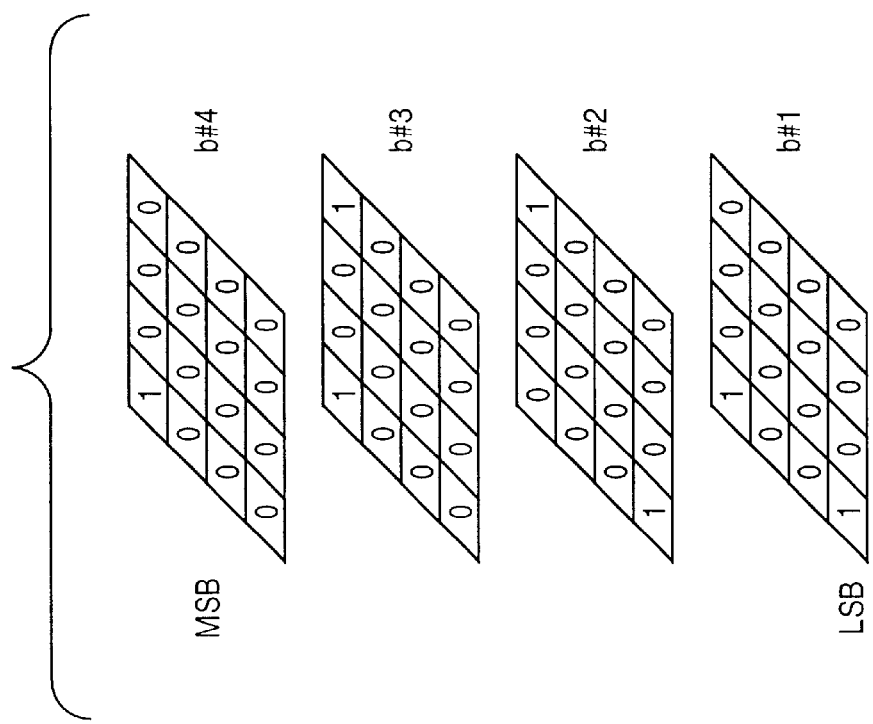

FIGS. 10A and 10B briefly show the decoding processing performed by the entropy decoding unit 313. In FIG. 10A, the sequence having the size of 4×4 is constructed with four bit planes. In actual bit streams, the bit planes are interleaved with other sequences as shown in FIG. 7B.

Herein, assume that decoding begins from the fourth bit plane (b#4), as shown in FIG. 10B, and the decoded result has reached the number of bytes subjected to decoding at the second bit plane (b#2). Then, the entropy coding unit 313 terminates decoding, inserts 0 to the remaining bit planes, and outputs the resultant data to the inverse quantization unit 314. Alternatively, the entropy coding unit 313 may add a predetermined offset to the resultant data, obtained by inserting 0 to the remaining bit planes, to minimize an error between the resultant values and values obtained in a case where all bit planes are decoded, and then may output the result.

Since the processing performed by the inverse quantization unit 314 and subsequent units is the same as the case of space scalable, description for the subsequent processing will not be provided herein.

As has been set forth above, according to the decoding function of the compression/decompression unit 32, image quality of a decompressed image changes in accordance with the amount of decoded data determined by the decode controller 320, and the image quality improves as the amount of decoded data increases.

Operation Flowchart

Figure 11A:
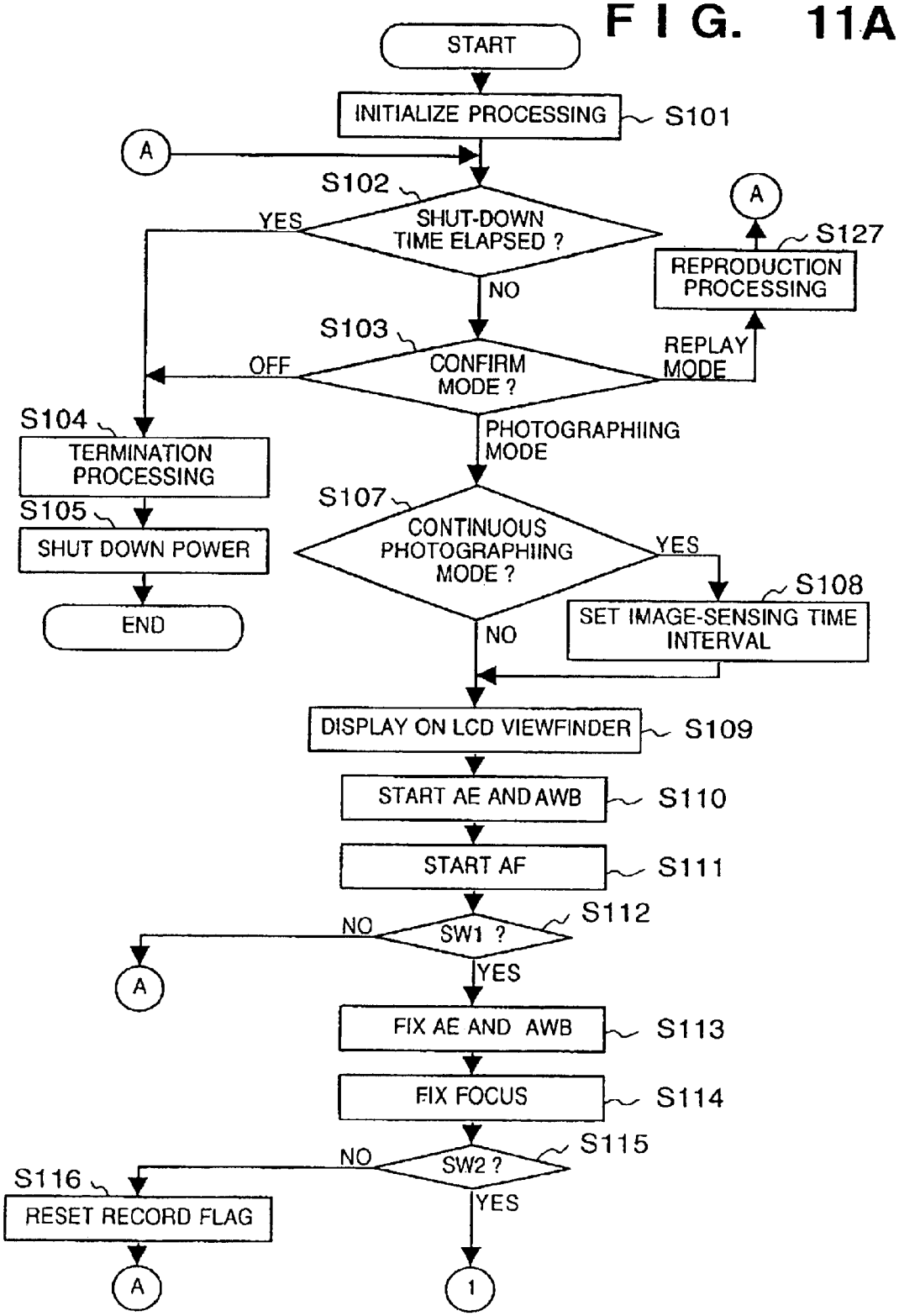
FIGS. 11A and 11B are flowcharts showing the main routine performed by an image sensing apparatus according to the first embodiment.
Figure 11B:
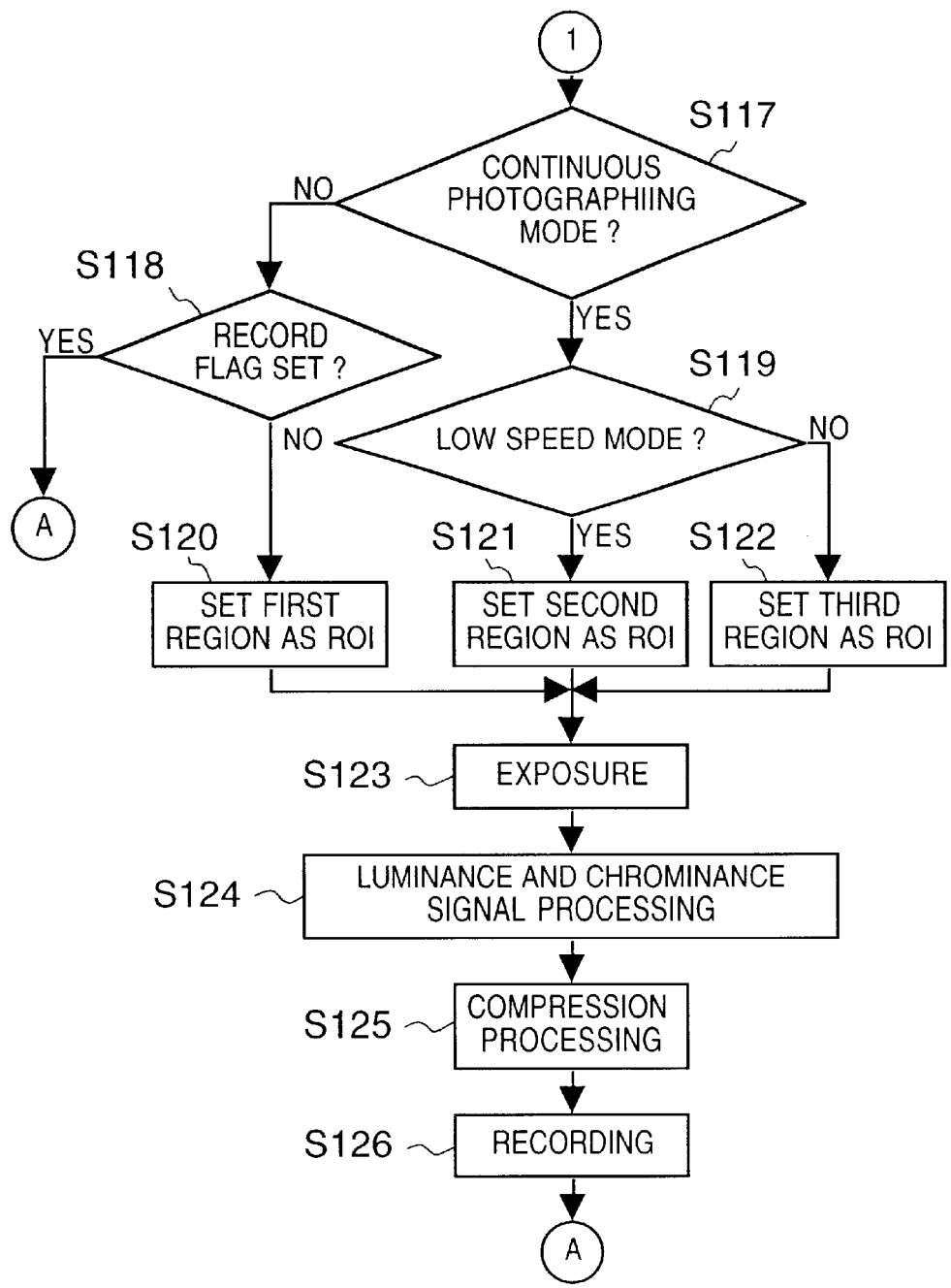

FIGS. 11A and 11B are flowcharts showing the main routine performed by the image sensing apparatus 100 having the above-mentioned construction. This processing is realized by the system control unit 50 which executes a program stored in the memory 52.

When the power of the image sensing apparatus is turned on by battery exchange or the like, the system control unit 50 initializes flags, control variables and so on (S101).

Then the value of an auto-shutdown timer (not shown), which automatically shuts down the power if the apparatus is not operated for a predetermined time period, is confirmed (S102). If the timer indicates that the predetermined time has elapsed, the control proceeds to step S104 to execute termination processing for turning off the power. More specifically, display screens of respective display units are changed to termination states; the barrier 102 is closed to protect the image sensing unit; necessary parameters including flags, control variables and so forth, and set values as well as set modes are stored in the non-volatile memory 56; and unnecessary power of respective units in the image sensing apparatus 100, including image display unit 28, is shut off by the power controller 80. Then, the power of the image sensing apparatus is turned off (S105).

In step S102, if the timer indicates that the predetermined time has not elapsed, the mode set in the image sensing apparatus 100 is confirmed in step S103. For this, the system control unit 50 determines the setting position of the mode dial 60. If the mode dial 60 is set in the power OFF position, control proceeds to step S104. If the mode dial 60 is set in the photographing mode, the control proceeds to step S107. If the mode dial 60 is set in the replay mode, the system control unit 50 executes reproduction processing (S127), and then the control returns to step S102. Note that the reproduction processing performed herein is to read compressed image data from the recording medium 200, decompress the image data, and display an image. Detailed description of the reproduction processing will not be provided in the first embodiment.

If the mode confirmed in step S103 is a photographing mode, the control proceeds to step S107 to determine if the photography mode is a continuous photographing mode. If a continuous photographing mode is confirmed, the time interval of continuous photographing is set in step S108 (herein, assume that high-speed/low-speed mode is set). The system control unit 50 stores the setting state in the memory 52, and control proceeds to step S109. If the continuous photographing mode is not confirmed in step S107, control proceeds directly to step S109.

In step S109, the power of the image display unit 28, e.g., an LCD viewfinder or the like, is turned on, thereby activating the image display operation.

In steps S110 and S111, metering, colorimetering, and focusing operations are started. The system control unit 50 reads charged signals from the image sensing device 14, and serially transmits picked up image data to the image processing unit 20 via the A/D converter 16. The image processing unit 20 performs AE, AWB, and AF processing employing the TTL system on the image data. To perform each of these processes, necessary portions are cut out and extracted from all the sensed pixels and used for computation. In this manner, an optimum computation can be performed for various modes of AE, AWB, and AF employing the TTL system, e.g., center-weighted light reading mode, averaged overall light reading mode, evaluation light reading mode and so on.

The system control unit 50 continues AE control of the exposure controller 40 until the exposure (AE) is determined appropriate based on the computation result of the image processing unit 20. Furthermore, based on the computation result of the image processing unit 20 and measurement data obtained by the AE control, the system control unit 50 controls color processing parameters of the image processing unit 20, thereby performing AWB control to achieve appropriate white balance. In step S111, the system control unit 50 controls the focusing controller 42 to perform AF control on the measurement data obtained by AE control, so as to achieve proper focus.

In step S112, it is determined whether or not the shutter trigger switch 62 (SW1) is turned on. If SW1 is turned off, control returns to step S102. If SW1 is turned on, control proceeds to step S113, where the optimum exposure is determined based on the current metering value, and the exposure controller 40 is controlled. Then, in step S114, the distance the lens is to be driven is determined based on the current focusing value, and the focusing controller 42 is controlled.

Next, in step S115, it is determined whether or not the shutter trigger switch 64 (SW2) is turned on. If SW2 is turned off, control proceeds to step S116, where record flags stored in the memory 52 are cleared, and control returns to step S102. If SW2 is turned on, control proceeds to step S117 (FIG. 11B), and a photographing operation begins.

In step S117 in FIG. 11B, the setting of continuous photographing mode stored in step S107 is confirmed. If the mode is not set in the continuous photographing mode, control proceeds to step S118, to perform a single photographing operation. In step S118, the record flag stored in the memory 52 is confirmed. If the record flag is set, control returns to step S102. Although details will be described later, note herein that the record flags are set in the ON state when a single photographing operation is completed. By virtue of the foregoing processes, even if the switch SW2 is depressed continuously in the single photographing mode, image sensing is not performed a plural number of times. If the record flag is not set in step S118, control proceeds to step S120, where the ROI (region of interest) is set in the first region. An example of the first region is shown in FIG. 12A.

If the continuous photographing mode is confirmed in step S117, control proceeds to step S119, where a high-speed mode or low-speed mode is determined. If a low-speed mode is set, the ROI is set in the second region in step S121. If a high-speed mode is set, the ROI is set in the third region in step S122. Then, control proceeds to step S123. An example of the second region is shown in FIG. 12B, and an example of the third region is shown in FIG. 12C. FIGS. 12A to 12C show that the first region is the largest of the three regions. In other words, the ROI according to the first embodiment is set in the largest area when the single photographing mode is set. Furthermore, when the continuous photographing mode is set, the ROI is set in a larger region in the low-speed mode than in the high-speed mode. In other words, the shorter the image sensing interval, the smaller the ROI is set.

Next, in step S123, the system control unit 50 controls the exposure controller 40 based on the metering value stored in the internal memory of the system control unit 50 or the memory 52, thereby opening the shutter 12 having a diaphragm function according to the f-stop value. After an elapse of exposure time based upon the metering value, the shutter 12 is closed, charged signals are read out of the image sensing device 14, and sensed image data is written in the memory 30 through the A/D converter 16, image processing unit 20, and memory controller 22, or through the A/D converter 16 and memory controller 22.

In step S124, the data stored in the memory 30 is processed by the image processing unit 20, and luminance and chrominance signals, are generated and stored in the memory 30. The system control unit 50 reads the image data out of the memory 30, and transfers display image data to the image display memory 24 through the memory controller 22.

In step S125, the compression/decompression unit 32 compresses the luminance signal and chrominance signal, generated in step S124, based on the ROI set in steps S120, S121 and S122, and the compressed data is stored in the memory 30. For compressing data in the ROI, various methods such as the JPEG 2000 or the like are proposed and under review. An example of a compression method employed by the compression/decompression unit 32 according to the first embodiment is briefly described below.

Figure 14A:
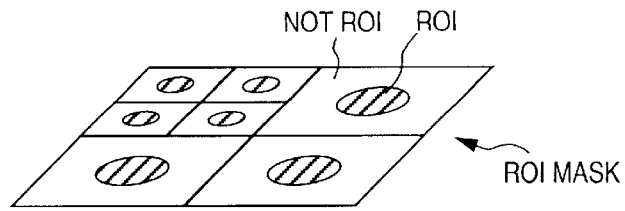
FIG. 14A shows an example of an ROI mask.

First, a bit-plane image, where each position of an image is distinguishable whether it is an ROI or non-ROI portion with 1-bit data, is generated as an ROI mask. An example of ROI mask is shown in FIG. 14A. In FIG. 14A, assume that the circled portion in each sub-band is the ROI. Therefore, the discrimination of the ROI portion/non-ROI portion is made for each sub-band. When coding the coefficients which are obtained by performing discrete wavelet transformation on the image, a code (ROI mask code) indicative of ROI is added to coefficients belonging to the ROI portion. Then, the ROI portion and non-ROI portion are compressed and coded in separate sequences (code arrays). Thus, when the data is decoded by the decoder, the data seems as if there are plural types of images: the ROI image and non-ROI image.

Furthermore, another compression method described hereinafter is also applicable.

Figure 14B:
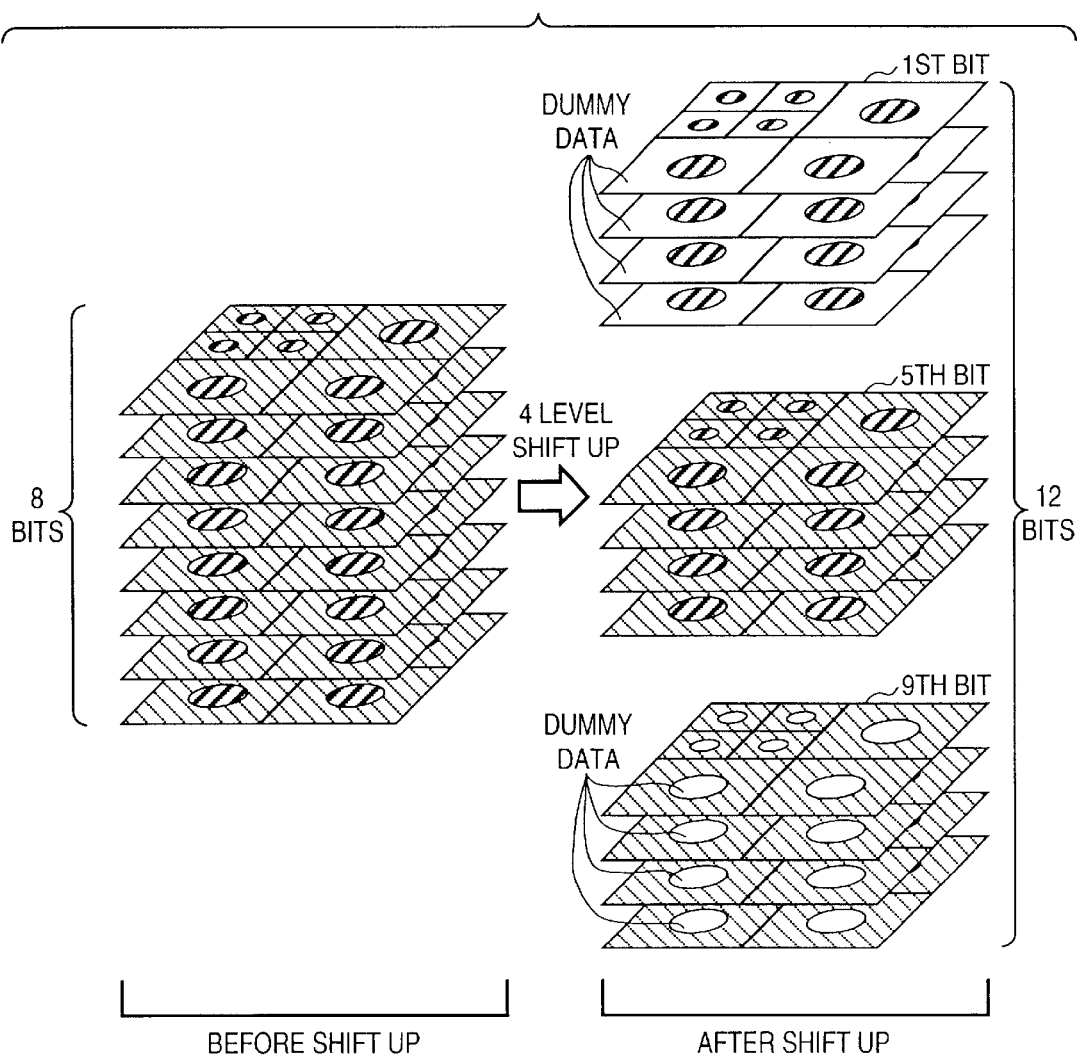
FIG. 14B is an explanatory view showing an example of shifting up the ROI portion.

An ROI mask is generated similarly to the above-described compression method. When coding the coefficients obtained by discrete wavelet transformation, the coefficients belonging to the ROI portion are shifted up by a predetermined number of levels. For instance, assume a case where each coefficient obtained by discrete wavelet transformation is formed with 8 bits, and the coefficient is shifted up by four levels (bits). After the shift-up, the coefficient is formed with 12 bits. This operation is shown in FIG. 14B. Assume in FIG. 14B that the circled portion in each sub-band is the ROI.

As shown in FIG. 14B, in the image data (each coefficient after discrete wavelet transformation) on which shift-up is performed, image data for the ROI portion exists in the 1st to 8th bits of the 12 bits, while image data for the non-ROI portion exists in the 5th to 12th bits. Dummy data 0 is input to the 9th to 12th bits for the ROI portion and 1st to 4th bits for the non-ROI portion. In subsequent coding processing, each coefficient of the 12 bits is treated as wavelet transformation data.

As described above, when coding complying with the JPEG 2000 is performed, the upper-bit planes are preferentially coded, and coding of the lower-bit planes is omitted according to the condition. However, by performing the shift-up of coefficients as described above, the portion shifted, i.e., the ROI portion, is coded for the lower-bit planes, thus achieving high image quality.

Note that the primary characteristic of the first embodiment is the designation method of ROI. Thus, the method of coding and decoding the ROI portion is not limited. Therefore, the ROI portion may be coded and decoded by a method other than the above-described one complying with the JPEG 2000. However, it should be noted that according to the above-described method of shifting up the ROI portion, the ROI can quickly be decoded by the bit-plane coding processing.

Image data compressed in the foregoing manner is stored in the memory 30. In step S126 in FIG. 11B, the compressed image data stored in the memory 30 is converted to file data having a predetermined format. Then, the file data is transferred and recorded in the recording medium 200, e.g., memory card, compact flash card or the like, through the interface 90 and connector 92. At this step, the record flags stored in the memory 52 are set to ON. After the data is recorded in the recording medium 200, the series of photographing sequences end, and control returns to step S102 to prepare for the next operation.

As has been set forth above, according to the first embodiment, by virtue of automatically setting the most appropriate region of interest (ROI) subjected to high image quality in accordance with the photographing mode, it is possible to achieve high image quality of the appropriate region in accordance with the photographing mode. Therefore, a user can easily obtain image quality suitable to the photographing purpose.

Particularly, when performing single photographing, still images having high quality can be obtained.

Furthermore, since the first embodiment is configured such that the ROI is changed according to the continuous photographing speed (high speed/low speed), the image sensing interval can be first secured in the continuous photographing mode. Note that in a case where plural image sensing intervals can be set for continuous photographing, if compression and recording processing for one image is possible within the set interval, the ROI is set relatively large so as to obtain the highest image quality in continuous photographing. On the other hand, if compression and recording processing for one image is not possible within the set interval, the ROI is set small so as to secure the set image sensing intervals and perform continuous photographing. Therefore, particularly for a case where a user desires to arbitrarily set the image sensing intervals in the continuous photographing mode, it is possible to prioritize securing the set interval while recording a high-quality image with respect to the region of interest.

Note, although the first embodiment has described a case of setting two modes: high-speed and low-speed for the continuous photographing mode, the present invention is not limited to these two modes. For instance, the photographing speed settable in the continuous photographing mode may be one mode or more than three modes, and the image sensing intervals may be set arbitrarily. In other words, as described in the ROI setting processing in steps S120, S121 and S122 in FIG. 11B, the shorter the image sensing interval, the smaller the ROI is set in the first embodiment.

<Second Embodiment>

Hereinafter, a second embodiment according to the present invention is described.

The second embodiment is characterized by making the photographing mode selectable for either designating an ROI mode or not designating an ROI mode. Since the construction of the image sensing apparatus according to the second embodiment is the same as that described in the first embodiment with reference to FIG. 1, hereinafter the same reference numerals as that in FIG. 1 are used and detailed description will not be provided.

Figure 13A:
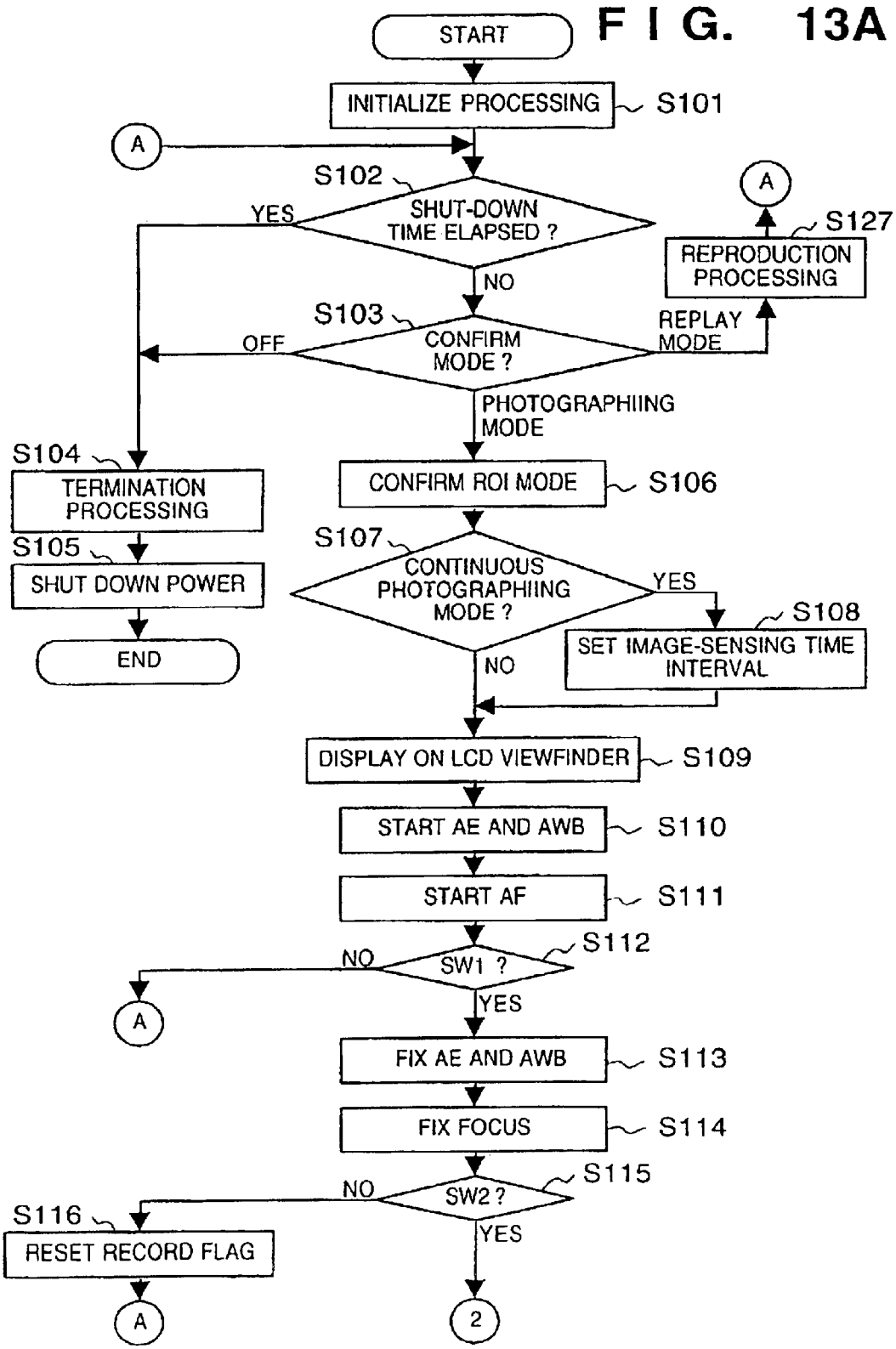
FIGS. 13A and 13B are flowcharts showing the main routine performed by an image sensing apparatus according to a second embodiment of the present invention.
Figure 13B:
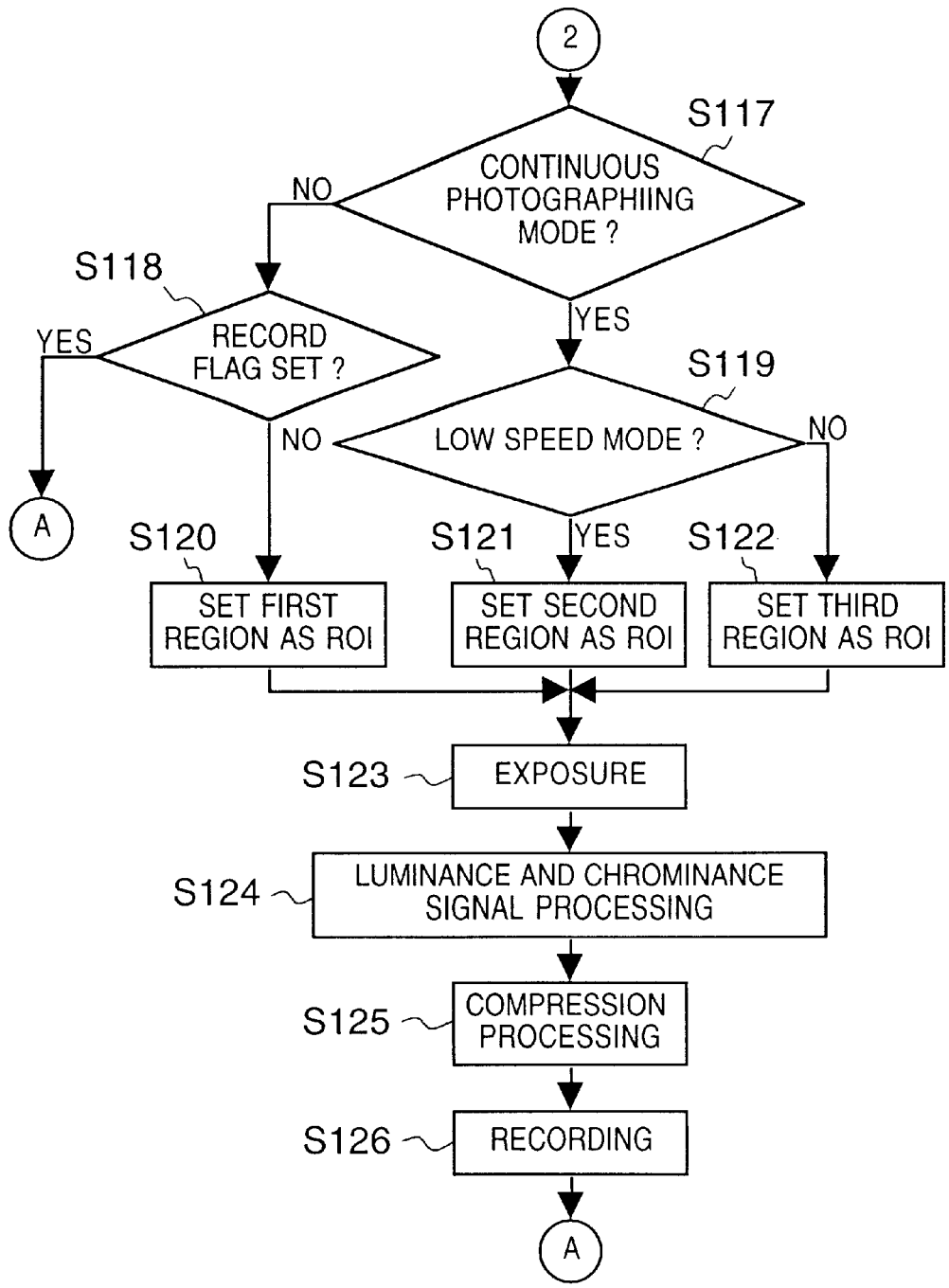

FIGS. 13A and 13B are flowcharts of the main routine according to the second embodiment. In contrast with FIGS. 11A and 11B described in the first embodiment, according to FIGS. 13A and 13B, after a photographing mode is confirmed in step S103 and before the continuous photographing mode is determined in step S107, the ROI mode is confirmed in step S106. Since other steps in FIGS. 13A and 13B are the same as that in FIGS. 11A and 11B, detailed description thereof will not be provided herein.

More specifically, according to the second embodiment, when photographing is performed, the system control unit 50 determines in step S106 whether or not the ROI mode is designated, and the result of the determination is stored in the memory 52 or the like. In the second embodiment, designation of the ROI mode may be made by the mode dial 60, operation unit 70 or other configurations.

As described above, designation/non-designation of the ROI mode is stored. Then, when the ROI is set in steps S120, S121 and S122 in FIG. 13B, the system control unit 50 reads the stored ROI mode. If non-designation of the ROI is stored, an ROI is not set, whereas if designation of the ROI is stored, the ROI is set in the first, second and third regions, similar to the setting process in the first embodiment.

As has been set forth above, the second embodiment enables a user to arbitrarily designate whether or not the ROI is to be automatically set. By virtue of this, a user can perform photographing while maintaining uniform image quality for the entire sensed image regardless of the setting of continuous/single photographing mode. Thus, flexibility in expression of a sensed image is increased.

<Third Embodiment>

Hereinafter, a third the third embodiment according to the present invention is described.

In general, when a sensed image includes a large amount of high-frequency components, the amount of compressed data is larger than that including less amount of high-frequency components. For this reason, data transfer and data writing in a recording medium require a longer time. In other words, image sensing intervals in continuous photographing vary depending on the picture of the sensing image.

Particularly, when the ROI mode is designated as described in the second embodiment, the total amount of compressed data varies depending on whether or not the image in the set ROI includes a large amount of high-frequency components, and the fluctuation is larger in the case where the ROI mode is designated than the case where the ROI mode is not designated. Therefore, if the ROI mode is designated in the continuous photographing mode, the variation of image sensing intervals becomes larger, and in some cases, a series of continuously sensed images cannot be obtained as intended by the user.

In view of this, the third embodiment is characterized by not designating the ROI mode when the continuous photographing mode is set. Note that since the construction of the image sensing apparatus according to the third embodiment is the same as that described in the first embodiment with reference to FIG. 1, hereinafter the same reference numerals as that in FIG. 1 are used and detailed description will not be provided.

The main routine according to the third embodiment is basically the same as the flowcharts in FIGS. 11A and 11B according to the first embodiment. However, the third embodiment is characterized by not performing the ROI setting in steps S121 and S122.

As described above, according to the third embodiment, by not automatically setting the ROI in the continuous photographing mode, variation of the image sensing intervals can be kept within a predetermined range. Therefore, image sensing intervals can be kept short or constant when performing continuous photographing.

Note that in the continuous photographing mode of the present invention, if the image sensing intervals are shortened, the resultant images become a motion image. Thus, the continuous photographing mode described in each of the foregoing embodiments is also applicable as the motion-image sensing mode. In other words, the following characteristics are also regarded as a part of the present invention: setting different ROIs for single image sensing and motion-image sensing; not designating an ROI at the time of motion-image sensing; and changing the ROI setting in accordance with the image sensing intervals in a motion-image sensing mode.

Note that in each of the foregoing embodiments, a dedicated frame memory is provided for the compression/decompression unit 32 for explanatory purpose. However, the memory 30 shown in FIG. 1 may substitute for the frame memory.

<Other Embodiments>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (recording medium) storing program codes for performing the aforesaid processes to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention. Furthermore, besides the aforesaid functions according to the above embodiments being realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer, or in a memory provided in a function expansion unit which is connected to the computer, a CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts shown in FIGS. 11A and 11B or FIGS. 13A and 13B.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   mode setting means for setting one of a plurality of photographing modes, wherein the plurality of photographing modes includes at least a first photographing mode for performing sensing operations at long time intervals and a second photographing mode for performing sensing operations at short time intervals;
   region setting means for setting a specific region of an image to be sensed in accordance with the photographing mode set by said setting means, wherein the specific region corresponding to the first photographing mode is larger than the specific region corresponding to the second photographing mode;
   image sensing means for sensing an image in the photographing mode set by said setting means and outputting image data corresponding to the image; and
   compression means for compressing the image data of the specific region of the image by a compression method different from that of other regions of the image.

2. The image sensing apparatus according to claim 1, wherein said region setting means changes a size of the specific region in accordance with the photographing mode set by said setting means.

3. The image sensing apparatus according to claim 1, wherein said region setting means changes a position of the specific region in accordance with the photographing mode set by said setting means.

4. The image sensing apparatus according to claim 1, wherein said compression means compresses the specific region and other regions with different compression coefficients.

5. The image sensing apparatus according to claim 4, wherein said compression means compresses the specific region with higher image quality.

6. The image sensing apparatus according to claim 4, wherein said compression means performs coding of a coefficient obtained by performing discrete wavelet transformation on the image.

7. The image sensing apparatus according to claim 6, wherein said compression means performs coding of the coefficient for the specific region, as a code array different from that of other regions.

8. The image sensing apparatus according to claim 6, wherein said compression means performs coding of the coefficient for the specific region by shifting up the coefficient by predetermined levels.

9. The image sensing apparatus according to claim 1, wherein the first photographing mode is a single photographing mode for sensing a single image, and the second photographing mode is a continuous photographing mode for continuously sensing a plurality of images.

10. The image sensing apparatus according to claim 1, wherein the first photographing mode is a first continuous photographing mode for continuously performing sensing operations for a plurality of images at long time intervals, and the second photographing mode is a second continuous photographing mode for continuously performing sensing operations for a plurality of images at short time intervals.

11. The image sensing apparatus according to claim 1, wherein said mode setting means is further capable of setting either a mode where the specific region is set by said region setting means, or a mode where the specific region is not set by said region setting means.

12. The image sensing apparatus according to claim 1, wherein said region setting means does not perform setting of the specific region when a continuous photographing mode is set by said mode setting means.

13. The image sensing apparatus according to claim 1, further comprising recording means for recording the image compressed by said compression means in a recording medium.

14. The image sensing apparatus according to claim 1, further comprising reproduction means for reproducing and displaying the image compressed by said compression means.

15. An image sensing apparatus comprising:
   mode setting means for setting a photographing mode;
   region setting means for setting a specific region of an image to be sensed in accordance with the photographing mode set by said mode setting means;
   image sensing means for sensing an image in the photographing mode set by said mode setting means and outputting image data corresponding to the image; and
   compression means for compressing the image data of the specific region of the image by a compression method different from that of other regions of the image,
   wherein said mode setting means selectively sets either a single photographing mode for sensing a single image, or a continuous photographing mode for continuously sensing a plurality of images, and
   wherein said region setting means sets a larger specific region in the single photographing mode than that in the continuous photographing mode.

16. An image sensing apparatus comprising:
   mode setting means for setting a photographing mode;
   region setting means for setting a specific region of an image to be sensed in accordance with the photographing mode set by said mode setting means;
   image sensing means for sensing an image in the photographing mode set by said mode setting means and outputting image data corresponding to the image; and compression means for compressing the image data of the specific region of the image by a compression method different from that of other regions of the image, wherein said mode setting means selectively sets either a single photographing mode for performing sensing operations for a single image, or a continuous photographing mode for continuously performing sensing operations for a plurality of images, wherein in the continuous photographing mode, said mode setting means selectively sets an image-sensing time interval, and wherein in the continuous photographing mode, the shorter the image-sensing time interval, the smaller the specific region is set by said region setting means.

17. A control method of an image sensing apparatus, comprising:

a mode setting step of setting one of a plurality of photographing modes, wherein the plurality of photographing modes includes at least a first photographing mode for performing sensing operations at long time intervals and a second photographing mode for performing sensing operations at short time intervals;

a region setting step of setting a specific region of an image to be sensed in accordance with the photographing mode set in said setting step, wherein the specific region corresponding to the first photographing mode is larger than the specific region corresponding to the second photographing mode;

an image sensing step of sensing an image in the photographing mode set in said mode setting step and outputting image data corresponding to the image; and a compression step of compressing the image data of the specific region of the image by a compression method different from that of other regions of the image.

18. The control method according to claim 17, wherein the first photographing mode is a single photographing mode for sensing a single image, and the second photographing mode is a continuous photographing mode for continuously sensing a plurality of images.

19. The control method according to claim 17, wherein the first photographing mode is a first continuous photographing mode for continuously sensing a plurality of images at long time intervals, and the second photographing mode is a second continuous photographing mode for continuously sensing a plurality of images at short time intervals.

20. A recording medium having recorded thereon a processing program for an image sensing apparatus, the program executing the steps of:

a mode setting step of setting one of a plurality of photographing modes, wherein the plurality of photographing modes includes at least a first photographing mode for performing sensing operations at long time intervals and a second photographing mode for performing sensing operations at short time intervals;

a region setting step of setting a specific region of an image to be sensed in accordance with the photographing mode set in said mode setting step, wherein the specific region corresponding to the first photographing mode is larger than the specific region corresponding to the second photographing mode;

an image sensing step of sensing an image in the photographing mode set in said mode setting step and outputting image data corresponding to the image; and a compression step of compressing the image data of the specific region of the image by a compression method different from that of other regions of the image.

21. A control method of an image sensing apparatus, comprising:

a mode setting step of setting a photographing mode;

a region setting step of setting a specific region of an image to be sensed in accordance with the photographing mode set in said mode setting step;

an image sensing step of sensing an image in the photographing mode set in said mode setting step and outputting image data corresponding to the image; and a compression step of compressing the image data of the specific region of the image by a compression method different from that of other regions of the image, wherein said mode setting step selectively sets either a single photographing mode for sensing a single image, or a continuous photographing mode for continuously sensing a plurality of images, and wherein said region setting step sets a larger specific region in the single photographing mode than that in the continuous photographing mode.

22. A control method of an image sensing apparatus, comprising:

a mode setting step of setting a photographing mode;

a region setting step of setting a specific region of an image to be sensed in accordance with the photographing mode set in said mode setting step;

an image sensing step of sensing an image in the photographing mode set in said mode setting step and outputting image data corresponding to the image; and a compression step of compressing the image data of the specific region of the image by a compression method different from that of other regions of the image, wherein said mode setting step selectively sets either a single photographing mode for sensing a single image, or a continuous photographing mode for continuously sensing a plurality of images, wherein in the continuous photographing mode, said mode setting step is capable of setting an image-sensing time interval, and wherein in the continuous photographing mode, the shorter the image-sensing time interval, the smaller the specific region is set in said region setting step.

* * * * *

UNITED STATES PATENT AND TRADEMARK OFFICE
CERTIFICATE OF CORRECTION

PATENT NO. : 6,917,384 B1
DATED : July 12, 2005
INVENTOR(S) : Nobuo Fukushima

It is certified that error appears in the above-identified patent and that said Letters Patent is hereby corrected as shown below:

<u>Column 16,</u>
Line 4, "the third" should be deleted.

Signed and Sealed this

Twenty-fifth Day of April, 2006

JON W. DUDAS
*Director of the United States Patent and Trademark Office*